3,010,791
PROCESS FOR PREPARING SILICA
PIGMENT
Edward M. Allen, Doylestown, Ohio, assignor, by mesne assignments, to Pittsburgh Plate Glass Company
No Drawing. Filed Aug. 2, 1957, Ser. No. 675,818
7 Claims. (Cl. 23—182)

This invention relates to a novel method of treating a siliceous pigment to insure production of a material having high dispersibility and to the improvement of dispersion of such a pigment in rubber.

The silica pigment contemplated is prepared by precipitation in aqueous medium according to various processes including those disclosed in my application Serial No. 283,721, filed April 22, 1952. When in dry form, i.e., dry to touch, it is in the form of finely porous silica flocs which contain in excess of 85 percent by weight of $SiO_2$, measured on the anhydrous basis (that is, on a basis excluding both bound and free water), bound water in the range of 3 to 14 moles per mole of $SiO_2$ and may contain up to 10 or 15 percent by weight of free water. The average ultimate particle size of this silica is below 0.05 micron, usually in the range of 0.01 to 0.05 micron. Surface area of the product of the type contemplated normally is 50 to 300 (preferably 60 to 200) square meters per gram measured by the Brunauer-Emmett-Teller method substantially as described in Journal American Chemical Society, vol. 60, page 309 (1938).

This pigment may contain small amounts of metal oxides such as alkaline earth metal oxides or like oxides of zinc, calcium, magnesium, barium, aluminum, etc. usually in the proportion of one mole of the metal oxide per 10 to 150 moles of $SiO_2$.

The products described above may be further treated to reduce the bound water content thereof to as low as one mole of bound water to 14 to 85 moles of $SiO_2$ according to the process disclosed in an application of Alphonse Pechukas, Serial No. 290,536, filed May 28, 1952, now Patent No. 2,805,956.

The terms "free water," as used herein, is intended to denote the water which may be removed from the silica pigment by heating the pigment at a temperature of 105° C. for a period of 24 hours in a laboratory oven. The term "bound water," as used herein, is intended to mean the amount of water which is driven off from a silica pigment by heating the pigment at ignition temperature, for example, 1000 to 1200° C., until no further water can be removed, minus the amount of free water in the pigment.

There appears to be a material difference in the manner in which free water and bound water are held in the molecule. The bound water appears to be chemically combined with the silica particle. For this reason, the bound water does not come off readily unles dried at temperatures above 350° C. On the other hand, the free water comes off readily upon drying at normal temperatures. Even after drying some portion of water will be absorbed as free water when the silica is allowed to stand in atmospheric air of normal humidification. When bound water is removed, however, only a minor portion thereof is reabsorbed on standing.

While the above pigments are very effective reinforcing pigments and serve to improve the properties of rubber materially, it is difficult to attain optimum properties with the products directly produced directly upon drying the product, the dispersibility of the resulting dried pigment often varying, sometimes being good, other times poor. Sometimes the rubber produced contains visible white specks. Often the product is poor in appearance, being contaminated with discoloring impurities.

According to the present invention a novel method has been provided for improving the appearance and dispersibility of a silica pigment and providing a product which can be incorporated rapidly into rubber. In the practice of this process, the precipitated silica in admixture with water is heated to evaporate water while the particles of silica are allowed to remain in contact with each other and are caused to form agglomerates. Thereafter the silica is milled or otherwise ground to produce a fine powder and the fine powder is subject to compacting to compress the powder to a bulk density above 15 pounds per cubic foot, usually in the range of 18 to 30 pounds per cubic foot.

The formation of the initial agglomerated silica is obtained by drying the silica which, in the particle size herein contemplated, tends to agglomerate during drying unless precautions are observed. The filter cake is heated, usually but not necessarily mixed with some previously dried or partially dried silica, under conditions which permit wet silica particles to remain in contact with each other during drying. Thus, while the silica pigment may be tumbled during drying the degree of motion of the particles during drying is low so that damp particles are allowed to build up into larger agglomerates. Of course, drying in a tray dryer where the filter cake is not subjected to movement also produces agglomeration.

The bulk of the weight of the resulting agglomerates usually is in the form of particles above 100 mesh, usually 10 to 100 mesh in size and the bulk density of the product, after drying to the point where the free water is below 10–15% by weight, usually is above 15.

The dispersibility of this agglomerated product in rubber frequently is unsatisfactory, often producing "pinheads" or particles which are readily seen in the rubber. Often the color is iregular, some portions being quite white, other portions being discolored by impurities. Thus, it is desirable to improve this product as to color and dispersibility. This may be done by grinding the agglomerates to a fine particle size. Thus, after drying the pigment to a free water content of 0 to 15% by weight, the agglomerates are milled or ground to break up the aggregates, usually after cooling below 50° C., and milling is continued until a smooth fine powder is attained. This powder normally has an agglomerate size substantially entirely minus 200 mesh and a bulk density below 15, usually in the range of 5–12 pounds per cubic foot. Thereafter the powder is compacted by suitable means to compress the powder to a bulk density above about 18 (rarely above 30) pounds per cubic foot.

The effect of the grinding is to improve the dispersibility of the pigment in rubber. Surprisingly, applicant has observed that by compressing the ground material substantially to the bulk density of the initial agglomerated product the dispersibility of the product in rubber is even further improved. The time within which a quantity of the compressed silica may be incorporated into rubber is as much as one half to one third of the time required for incorporation of the uncompressed material.

Silica suitable for treatment according to the present invention may be prepared according to various methods including those disclosed in the above mentioned application, Serial No. 238,721, as well as those disclosed in British Patent No. 756,857.

In the practice of the process, the silica pigment after precipitation is recovered usually by filtration and the filter cake is allowed to dry. In the course of such drying the cake or portions thereof shrink and agglomerates which are relatively hard but which can be crumbled under pressure between the fingers are formed.

Frequently during drying the filter cake (which normally contains more than 80 percent by weight of water)

is mixed with enough predried or partially dried silica to reduce the mixture to a water content of 25 to 50% by weight. This may be done during or prior to drying.

While the mixture may be tumbled during drying, the degree of agelation is held low enough so as to permit agglomerate formation and to minimize agglomerate disintegration. The temperature of drying may range from 100 to 800° C. depending upon the amount of bound water desired to be retained.

The product thus obtained normally is a mixture of pellets or agglomerates and powder and ranges in agglomerate size from 10 to 100 mesh, the predominant weight being larger than 100 mesh. The bulk density of this product usually is about 18 pounds per cubic foot. However, the appearance of this product frequently is poor, the product frequently containing particles of iron scale and other discolored particles. The amount of such particles normally is less than 2% by weight of the product.

This product is ground to produce a powder which will pass through a screen having a fineness of minus 150 or minus 200 mesh or finer. The fine powder thus obtained normally has a bulk density below 15 pounds per cubic foot, frequently being as low as 2 to 10 pounds per cubic foot. It disperses well in rubber and is very white in appearance. However, its rate of incorporation into rubber is slow.

As previously explained, the powder is compressed to a bulk density of about 18 to 30 pounds per cubic foot. The compression may be conducted in various ways. For example, it may be poured into a mold and pressure applied thereto, thus producing a bonded cake.

A very effective method is to charge the silica pigment into a paper bag and compressing the bag, care being taken not to tear the paper. In a typical embodiment a mold having an interior chamber 10¾ inches in width, 16¼ inches in length, and 34 inches high, was provided. This mold was hinged along its sides to permit the mold to open with the sides swinging in a horizontal direction. A paper bag having the size and shape corresponding to that of the mold was placed in the mold and the sides of the bag were reinforced with cardboard reinforcing sheets of size about equal to the corresponding sides of the mold. The mold was closed and the bag filled with hydrated silica having a bulk density of about 5 to 15 pounds per cubic foot. A plunger having the contour and size of the interior of the chamber was introduced into the top of the mold and a pressure gradually rising up to about 140 to 150 pounds per square inch was applied on the silica. The plunger was withdrawn and further amounts of silica were introduced and compressed in this way, the process being repeated until 50 pounds of the silica had been pressed to produce a cake about 26 inches high and having the cross-section area of the mold. The bag was then removed from the mold.

The silica thus obtained is in the form of a lightly compacted cake which is easily broken up by squeezing with the fingers. It has a bulk density of about 20 pounds per cubic foot.

It will be noted that the above densification was accomplished by compressing the silica in bags which were reinforced by cardboard. The cardboard was used in order to avoid tearing the bag and may be removed from the bag after the compacting is complete. Other receptacles, such as corrugated paper boxes and the like, may be used in lieu of paper bags. However, it is generally found that the method of densification should be accomplished after the silica has been placed in a receptacle or container in which it is to be shipped since the densified product tends to crumble and become pulverulent upon handling and thus, in subsequent packaging, the advantageous effect of the densification tends to be lost.

In another experiment compression of the silica at a pressure of 800 pounds per square inch produces a product having a bulk density of 24 pounds per cubic foot.

The products herein contemplated may be incorporated in various rubber compositions including natural rubber, and synthetic rubber compositions, including butadiene-1,3, styrene copolymers, butadiene-acrylonitrile copolymers, butadiene-isobutylene copolymers (Butyl rubber) and like synthetic elastomers which are derived from polymerization of conjugated dienes such as butadiene-1,3, 2-chlorobutadiene, 1,3-isoprene, ethylene or the like, alone or with other polymerizable materials containing single polymerizable ethylenic

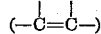

group including styrene, methyl methacrylate, methyl chloracrylate, acrylonitrile, vinyl acetate and their equivalents.

Typical rubber compositions are as follows:

| Composition A: | Parts by weight |
|---|---|
| GR-S | 100 |
| Zinc oxide | 5 |
| Sulphur | 3 |
| n-Cyclohexyl 2-benzothiazol sulphenamide | 1 |
| Processing oil | 5 |
| Phenyl beta naphthyl amine | 1 |
| Silica as prepared above | 68.2 |
| Composition B: | |
| Chemigum N-7 [1] (butadiene-acrylonitrile copolymer) | 70.0 |
| Plioflex 1502 [1] (butadiene-styrene copolymer) | 30.0 |
| Pliolite S6B (butadiene-styrene copolymer) | 20.0 |
| Zinc oxide | 5.0 |
| Sulfur | 1.5 |
| Silica described above having bulk density of 24 pounds per cubic foot | 65.0 |
| Medium process oil | 8.0 |
| Dibutyl phthalate | 3.0 |
| Cumar MH ½ (coumarone-indene and associated coal tar compounds sold by Barrett Division, Allied Chemical and Dye Corporation, New York 6, New York) | 5.0 |
| Stearic acid | 1.0 |
| Altax (benzothiazyl disulfide) | 1.75 |
| Tuads (tetramethylthiuram monosulfide) | 0.2 |

[1] Sold by Chemical Division, Goodyear Tire and Rubber Company, Akron 16, Ohio.

By grinding and then compressing the silica as herein disclosed, the compressed silica blends readily into rubber reducing the mixing time by as much as one third that required with powders, yet having the characteristics of powder.

Another excellent way to compress or densify the silica powder according to my invention is to pass the powder between a pair of rolls. However, these rolls must be specially constructed.

Thus, attempts to compress the silica powder by passage through a pair of rolls having metallic surfaces were found to be unsuccessful because the silica resisted passage through the rolls and tended to blow or flow away from the bight of the rolls.

I have found that this difficulty may be avoided by passing the silica between a pair of rolls each having a rubber surface on the outer periphery thereof which engages the silica. Any suitable synthetic or natural rubber which is wear and abrasion resistant, particularly rubber or like wear resistant material having a durometer hardness of 20 to 80, may be used. This includes natural rubber, GRS rubber, "Butyl" rubber and like polymers of a conjugated diene (butadiene, isoprene or chloroprene) or copolymers of such materials with styrene, acrylic acid, acrylonitrile isobutylene with styrene, acrylonitrile, isobutylene or the like, isocyanate rubbers and like materials.

In a typical example, an aqueous slurry of finely divided precipitated silica having an average ultimate particle size of about 0.025 micron is filtered producing a filter cake containing about 16 percent by weight of solids. This cake is mixed with partially dried silica containing about 50% of free water in the proportion of about one part by weight of cake per 0.5 part by weight of the partially dry silica and the mixture is tumbled in a steam heated kiln dryer heated to about 120–130° C. The resulting dry product containing about 2–4% of free water is obtained in the form of pellets or agglomerates having a pellet size of predominantly plus 100 mesh.

The product is milled and screened through a 325 mesh screen. The screened pigment was passed through a pair of rotating rolls having a rubber coating about one eighth of an inch on the periphery thereof and vulcanized to the metal surface of the rolls. The rolls were 20 inches in diameter and 2 inches wide and were held together by a hydraulic pressure of 250 pounds. The fine pigment was fed into the bight between the rolls at the rate of three pounds of pigment each 2.25 minutes. Flakes ranging from $\frac{1}{32}$ to one eighth inch in thickness were produced, the product having a bulk density of about 19 to 20 pounds per cubic foot.

Although the present invention has been described with particular reference to specific details of certain embodiments thereof, it is not intended such details shall be regarded as limitations upon the scope of the invention except insofar as included in the accompanying claims.

This application is a continuation-in-part of my co-pending applications Serial No. 283,721, filed April 22, 1952, now United States Letters Patent 2,805,955; Serial No. 308,286, filed September 6, 1952, now abandoned; and Serial No. 594,392, filed June 28, 1956, now abandoned.

I claim:
1. A method of preparing a silica pigment capable of being dispersed in rubbery compositions which comprises heating a mixture of water and a finely-divided, precipitated silica pigment having an average, ultimate particle size below 0.05 micron at a temperature high enough to evaporate water therefrom, permitting the particles to agglomerate together during said heating and thereby producing agglomerates of said particles, grinding the agglomerates to produce a silica powder of a bulk density lower than that of said agglomerates and having a particle size below 150 mesh and compressing the resulting powder to a higher bulk density of 15 to 30 pounds per cubic foot.

2. A method of preparing a silica pigment for milling into a vulcanizable rubbery composition which comprises heating a mixture of water and a finely divided silica pigment having an average, ultimate particle size below 0.05 micron at a temperature high enough to evaporate water therefrom while holding the particles of said silica in contact with each other, permitting the particles to agglomerate together during said heating and thereby producing agglomerates of said particles, grinding the agglomerates to produce a silica powder of a bulk density lower than that of said agglomerates and having a particle size below 150 mesh, compressing the resulting powder to a higher bulk density of 15 to 30 pounds per cubic foot.

3. The process of claim 1 wherein the silica has an average ultimate particle size of 0.01 to 0.05 micron.

4. The process of claim 1 wherein the silica has an average ultimate particle size of 0.01 to 0.05 micron and contains at least 90 percent by weight of $SiO_2$ on the anhydrous basis and a surface area of 25 to 200 square meters per gram.

5. A method of preparing a densified silica pigment capable of being dispersed in rubbery compositions which comprises heating a mixture of water and a finely-divided silica pigment having an average, ultimate particle size below 0.05 micron at a temperature high enough to evaporate water therefrom while holding the particles of said silica in contact with each other, permitting the particles to agglomerate together during said heating and thereby producing agglomerates of said particles, grinding the agglomerates to produce a silica powder of a bulk density lower than that of said agglomerates and having a particle size below 150 mesh, and densifying the powder to produce a product of a higher bulk density of 15 to 30 pounds per cubic foot by passing the powder between a pair of rubber coated rolls the outer peripheries of which engage the silica.

6. A method of preparing a silica pigment for milling into a vulcanizable rubbery composition which comprises heating a mixture of water and finely divided silica pigment having an average ultimate particle size below 0.05 micron at a temperature high enough to evaporate water therefrom while holding the particles of said silica in contact with each other, agglomerating the particles of silica pigment together during the heating thereby producing agglomerates of said particles, grinding the agglomerates until a silica powder of a bulk density lower than that of said agglomerates and having a particle size below 150 mesh is produced, compressing the resulting powder to a bulk density at least as great as the bulk density of the agglomerated particles and up to 30 pounds per cubic foot.

7. The method of claim 6 wherein the agglomerated particles are of a bulk density of about 18 pounds per cubic foot, and the silica is ground to a powder of below 15 pounds per cubic foot in bulk density.

References Cited in the file of this patent

UNITED STATES PATENTS

| | | |
|---|---|---|
| 1,739,305 | Hilditch et al. | Dec. 10, 1929 |
| 1,959,747 | Svendsen | May 22, 1934 |
| 1,973,211 | Kirkham | Sept. 11, 1934 |
| 2,195,754 | Robson | Apr. 2, 1940 |
| 2,302,832 | Behrman | Nov. 24, 1942 |
| 2,764,572 | Pechukas | Sept. 25, 1956 |
| 2,806,012 | Allen | Sept. 10, 1957 |

FOREIGN PATENTS

| | | |
|---|---|---|
| 214,062 | Great Britain | Apr. 17, 1924 |
| 653,993 | Great Britain | May 30, 1951 |

OTHER REFERENCES

Dannenberg et al.: India Rubber World, vol. 122, No. 6, September 1950, pp. 663–668.

Allen et al.; India Rubber World, August 1949, pp. 577–581 and 586.

UNITED STATES PATENT OFFICE
CERTIFICATE OF CORRECTION

Patent No. 3,010,791                              November 28, 1961

Edward M. Allen

It is hereby certified that error appears in the above numbered patent requiring correction and that the said Letters Patent should read as corrected below.

Column 1, line 13, for "in" read -- is --; line 55, for "unles" read -- unless --; column 2, line 35, for "iregular" read -- irregular --; line 62, for "238,721" read -- 283,721 --.

Signed and sealed this 20th day of November 1962.

(SEAL)
Attest:

ERNEST W. SWIDER                              DAVID L. LADD
Attesting Officer                                Commissioner of Patents